(12) United States Patent (10) Patent No.: US 8,671,687 B2
Gudmundson (45) Date of Patent: Mar. 18, 2014

(54) HYDROGEN BASED COMBINED STEAM CYCLE APPARATUS

(76) Inventor: Chris Gudmundson, Sacramento, CA (US)

( * ) Notice: Subject to any disclaimer, the term of this patent is extended or adjusted under 35 U.S.C. 154(b) by 511 days.

(21) Appl. No.: 12/932,131

(22) Filed: Feb. 18, 2011

(65) Prior Publication Data

US 2012/0210714 A1 Aug. 23, 2012

(51) Int. Cl.
*F01K 7/34* (2006.01)
*F01K 23/06* (2006.01)
*F02C 1/00* (2006.01)

(52) U.S. Cl.
USPC ............................ 60/653; 60/670; 60/39.182

(58) Field of Classification Search
None
See application file for complete search history.

(56) References Cited

U.S. PATENT DOCUMENTS

| | | | | |
|---|---|---|---|---|
| 3,101,592 | A * | 8/1963 | Robertson et al. | 60/39.463 |
| 3,232,050 | A * | 2/1966 | Robinson et al. | 60/671 |
| 3,404,529 | A * | 10/1968 | Lagerstrom | 60/802 |
| 3,459,953 | A * | 8/1969 | Brauser et al. | 290/2 |
| 4,238,925 | A * | 12/1980 | Lowther | 60/39.461 |
| 4,819,434 | A * | 4/1989 | Gudmundson | 60/653 |
| 4,932,204 | A * | 6/1990 | Pavel et al. | 60/772 |
| 5,331,806 | A * | 7/1994 | Warkentin | 60/39.465 |
| 5,357,746 | A * | 10/1994 | Myers et al. | 60/39.182 |
| 5,442,908 | A * | 8/1995 | Briesch et al. | 60/39.182 |
| 5,775,091 | A * | 7/1998 | Bannister et al. | 60/775 |
| 5,782,081 | A * | 7/1998 | Pak et al. | 60/39.181 |
| 5,918,460 | A * | 7/1999 | Connell et al. | 60/257 |
| 6,145,295 | A * | 11/2000 | Donovan et al. | 60/783 |
| 6,220,013 | B1 * | 4/2001 | Smith | 60/783 |
| 6,220,014 | B1 * | 4/2001 | Wada et al. | 60/778 |
| 6,226,980 | B1 * | 5/2001 | Katorgin et al. | 60/258 |
| 6,247,316 | B1 * | 6/2001 | Viteri | 60/716 |
| 6,286,297 | B1 * | 9/2001 | Wakazono et al. | 60/783 |
| 6,389,797 | B1 * | 5/2002 | Sugishita et al. | 60/39.182 |
| 6,405,537 | B1 * | 6/2002 | Wada et al. | 60/778 |
| 6,438,939 | B1 * | 8/2002 | Uematsu et al. | 60/39.182 |
| 6,530,208 | B1 * | 3/2003 | Sugishita et al. | 60/39.182 |
| 6,536,208 | B1 * | 3/2003 | Kretschmer | 60/258 |
| 6,546,713 | B1 * | 4/2003 | Hidaka et al. | 60/39.182 |
| 6,604,354 | B2 * | 8/2003 | Oto et al. | 60/39.182 |
| 6,615,575 | B2 * | 9/2003 | Liebig | 60/39.182 |
| 6,619,031 | B1 * | 9/2003 | Balepin | 60/246 |
| 6,957,540 | B1 * | 10/2005 | Briesch et al. | 60/772 |
| 7,748,210 | B2 * | 7/2010 | Chandrabose et al. | 60/39.181 |
| 8,161,748 | B2 * | 4/2012 | Haase | 60/618 |
| 2001/0015061 | A1 * | 8/2001 | Viteri et al. | 60/39.161 |
| 2002/0184873 | A1 * | 12/2002 | Dujarric | 60/203.1 |

(Continued)

FOREIGN PATENT DOCUMENTS

| | | | | | |
|---|---|---|---|---|---|
| EP | 1884638 | A2 * | 2/2008 | | C06D 5/00 |
| JP | 07243350 | A * | 9/1995 | | F02K 9/48 |
| JP | 2008063955 | A * | 3/2008 | | |
| RU | 2156721 | C1 * | 9/2000 | | B64G 1/14 |

*Primary Examiner* — Thomas Denion
*Assistant Examiner* — Jessica Kebea
(74) *Attorney, Agent, or Firm* — Mark C. Jacobs (57) ABSTRACT

A hydrogen based combined steam cycle apparatus having an irreversible isobaric Rankine steam cycle portion, an irreversible isobaric Carnot steam cycle portion and a reversible isobaric Rankine steam cycle portion, all three portions of which operate simultaneously. The apparatus includes a source of liquid oxygen, a source of liquid hydrogen, a combustion chamber, a first pump, a second pump, a pressure vessel, a steam turbine, a superheater, and a condenser.
A plurality of valves and a computer are used to control the flow of working fluid in the hydrogen based combined steam cycle apparatus.

7 Claims, 8 Drawing Sheets

(56) References Cited

U.S. PATENT DOCUMENTS

| | | | |
|---|---|---|---|
| 2004/0003592 A1* | 1/2004 | Viteri et al. | 60/651 |
| 2004/0026572 A1* | 2/2004 | Burton | 244/172 |
| 2009/0084107 A1* | 4/2009 | Gleasman | 60/670 |
| 2009/0120103 A1* | 5/2009 | Grimseth et al. | 60/805 |
| 2009/0288390 A1* | 11/2009 | Pavia et al. | 60/267 |
| 2010/0015039 A1* | 1/2010 | Doshi et al. | 423/652 |
| 2010/0300065 A1* | 12/2010 | Balepin | 60/204 |
| 2012/0036858 A1* | 2/2012 | Lacy et al. | 60/754 |

\* cited by examiner

IRREVERSIBLE ISOBARIC CARNOT STEAM CYCLE
(17-23-21-27)

REVERSIBLE ISOBARIC RANKINE STEAM CYCLE

FIG. 8   (29-23-21-27)

HYDROGEN BASED COMBINED STEAM CYCLE APPARATUS

BACKGROUND OF THE INVENTION

The present invention relates generally to a hydrogen based steam cycle apparatus and more particularly to a hydrogen based combined steam cycle apparatus.

The hydrogen base combined steam cycle apparatus of this invention includes a steam turbine and comprises an irreversible isobaric Rankine steam cycle portion, an irreversible isobaric Carnot steam cycle portion and a reversible isobaric Rankine steam cycle portion, all three steam cycle portions operating simultaneously, defined supra.

The hydrogen based combined steam cycle apparatus of this invention improves the efficiency of existing Rankine steam cycle engines by increasing the amount of working fluid mass made available to do work at the turbine, from a given amount of fuel. The cycle also eliminates the carbon dioxide and other harmful exhaust gasses emitted by conventional steam cycles burning fossil fuels.

Many steam turbine apparatii are known for generating power. In a number of these systems some of the energy is reused in one way or another.

In U.S. Pat. No. 4,819,434 which issued on Apr. 11, 1989 to C. R. Gudmundson there is disclosed an improvement in a steam turbine apparatus having a boiler having a first superheater, a first conduit having an inlet end and an outlet end, said outlet end being connected to said first superheater, a pressurized liquid working fluid source connected to said inlet end of said first conduit, said first superheater being adapted to convert said liquid working fluid to superheated vapor. A second conduit has an input end and an output end, the input end being connected to receive the superheated vapor from the superheater, and a turbine connected to receive the vapor from the output end of the second conduit. The improvement described in that patent comprises a structure for restricting flow through the second conduit. A third conduit is adapted to conduct a first portion of the superheated vapor from the second conduit from downstream of the restricting structure to a second superheater wherein the first portion of the conduit is adapted to conduct the further superheated vapor from the second superheater to the turbine. The result is improved utilization of the heat generated by the boiler whereby significant increases in output energy result.

In U.S. Pat. No. 4,932,204 which issued on Jun. 12, 1990, to J. Pavel et al. the efficiency of a combined cycle power plant is improved by preheating fuel supplied to a combustion turbine. The flow rate of feed water through an economizer section of a heat recovery steam generator is increased, and the excess flow, over that required to sustain saturated steam production in an evaporator section, is flowed through a heat exchanger to preheat the fuel.

In U.S. Pat. No. 5,357,746 which issued on Oct. 25, 1994 to G. A. Myers et al there is disclosed an improved system for recovering waste heat from a combustion turbine in a combined cycle power plant of the type that includes at least one combustion turbine and at least one steam turbine. The improved system includes a first heat recovery system for heating condensate in the steam turbine cycle with heat from the hot exhaust gases from the combustion-type turbine, and a second heat recovery system for heating the fuel that is used in the combustion turbine with heat from the exhaust gases. The second system permits recovery of heat energy that is not recovered by the first system, thereby improving plate efficiency.

In U.S. Pat. No. 6,286,297B1 which issued on Sep. 11, 2001, to O. Wakazono, et al. there is disclosed a combined cycle power generation plant which comprises a waste heat recovery boiler having a stabilizing burner at an upstream position thereof. The stabilizing burner is ignited during the time of start-up and speed increase of a gas turbine so that steam generation at the waste heat recovery boiler is accelerated. The steam is used effectively for cooling the gas turbine and driving a steam turbine. In addition, exhaust steam from the steam turbine is also used to cool the gas turbine. Consequently, the time for the plant to reach a full load can be shortened.

In U.S. Pat. No. 6,604,354 which issued on Aug. 12, 2003, to C. Oto, et al. there is disclosed a combined cycle power plant which comprises a gas turbine power facility, a heat recovery steam generator, a steam turbine power facility, and an existing boiler. The power generation plant further comprises a system for introducing steam, which steam is generated in the heat recovery steam generator and in the existing boiler, to the steam turbine of the steam turbine power facility through steam lines, which lines extend from the existing boiler and the heat recovery steam generator and are then joined together. A system for causing a line, which is arranged on a downstream side of a condenser provided in the steam turbine power facility, to branch off into feedwater lines, and for supplying condensed water, condensed by the condenser into the heat recovery steam generator and the existing boiler is provided.

In published Patent Application No. 2009/0084107 A1 to J. Y. Gleasman there is disclosed a process which provides energy from a hydrogen flame to produce ultra high temperature steam, which is water vapor having a temperature over 1200 degrees C., as an energy transfer medium to drive a steam turbine. The hydrogen fuel may be supplied to the system from a source of isolated hydrogen such as compressed or liquefied H2, but is more preferably generated near its site of combustion by irradiating an aqueous solution of one or more inorganic salts or minerals with radio frequency electromagnetic radiation having a spectrum and intensity selected for optimal hydrogen production. The ultra high temperature steam is produced by contacting the hydrogen flame and its combustion gases with surfaces in a ceramic steam generator unit. In one embodiment, a radio frequency generator produces hydrogen gas from sea water to provide hydrogen fuel to produce steam to drive the turbine.

Additional patents of interest are the following:

| U.S. Pat. No. | Issue Date | Patentee(s) |
| --- | --- | --- |
| 5,331,806 | Jul. 26, 1994 | Warkentin |
| 5,442,908 | Aug. 22, 1995 | Beiesch et al. |
| 5,782,081 | Jul. 22, 1998 | Pak et al. |
| 6,145,295 | Nov. 14, 2000 | Donovan et al. |
| 6,220,013 | Apr. 24, 2001 | Smith |
| 6,220,014 | Apr. 24, 2001 | Wada et al. |
| 6,389,797 | May 21, 2002 | Sugishita et al. |
| 6,405,537 | Jun. 21, 2002 | Wada et al. |
| 6,438,939 | Aug. 27, 2002 | Uematsu et al. |
| 6,530,208 | March 2003 | Sugishita et al. |
| 6,546,713 | April 2003 | Hidaka et al. |
| 6,615,575 | Sep. 9, 2003 | Liebig |
| 6,957,540 | Oct. 25, 2005 | Briesch et al. |
| 7,748,210 | Jul. 6, 2010 | Chandrabose |

SUMMARY OF THE INVENTION

It is an object of this invention to provide a new steam cycle apparatus.

It is another object of this invention to provide a new steam cycle apparatus having high efficiency.

A hydrogen based combined steam cycle apparatus according to this invention comprises an irreversible isobaric Rankine steam cycle portion, an irreversible isobaric Carnot steam cycle portion and a reversible isobaric steam cycle portion, the three steam cycle portions operating simultaneously. The apparatus includes a source of liquid oxygen, a source of liquid hydrogen, a combustion chamber; a first pump for pumping liquid oxygen and liquid hydrogen from their respective sources into the combustion chamber where the liquid hydrogen is burned in the presence of the liquid oxygen to produce heat, radiant energy and working fluid mass, which is in the form of a plasma. The apparatus also includes a superheater for receiving working fluid mass in the form of plasma from the combustion chamber and for cooling the plasma, a pressure vessel surrounding the combustion chamber, a steam turbine for receiving the plasma from the superheater and for outputting work. In addition, the apparatus includes a condenser for receiving working fluid from the steam turbine and for outputting liquid water, a second pump for pumping some of the liquid water from the condenser to either the pressure vessel for cooling the combustion chamber or back to the superheater. A first valve for regulating the flow of working fluid from the second pump to the superheater, a second valve for regulating the flow of working fluid from the second pump to the pressure vessel and a third valve for regulating the flow of working fluid from the pressure vessel to the superheater are provided. The apparatus also includes a plurality of conduits for operatively connecting certain component parts of the apparatus and a computer for controlling the operation of the first, second and third valves.

A method of operating a hydrogen based combined steam cycle apparatus having a source of liquid oxygen, a source of liquid hydrogen, a combustion chamber, a superheater, a pressure vessel surrounding the combustion chamber, a steam turbine and a condenser according to this invention comprises burning liquid oxygen and liquid hydrogen in the combustion chamber to produce heat, radiant energy and working fluid mass. The process also includes cooling working fluid mass in the form of plasma from the combustion chamber in the superheater, receiving working fluid mass from the superheater in the steam turbine and outputting work. In the method provided, at least some of the working fluid from the steam turbine in the condenser puts out liquid water. At least some of this liquid water is sent to the pressure vessel for use in preventing overheating of the combustion chamber. The method further includes regulating the flow of working fluid to the superheater, regulating the flow of working fluid to the pressure vessel; and regulating the flow of working fluid from the pressure vessel to the superheater.

Various other features and advantages will appear from the description to follow. In the description, reference is made to the accompanying drawings which form a part thereof, and in which are shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like references numerals represent like parts.

DETAILED DESCRIPTION OF THE PREFERRED EMBODIMENT

The present invention relates to a hydrogen based combined steam cycle engine and a method of controlling the flow of working fluid mass throughout the spatially dependent, time evolving steam cycle engine, attaining efficiencies in excess of existing steam cycles while eliminating the carbon dioxide and other harmful gasses emitted by a conventional Rankine steam cycle engine which burns fossil fuel.

The hydrogen based combined steam cycle apparatus of this invention includes an irreversible isobaric Rankine steam cycle portion, an irreversible isobaric Carnot steam cycle portion and a reversible isobaric Rankine steam cycle portion and wherein all three portions operate simultaneously. The steam cycle apparatus of this invention is referred to as "combined" in that it comprises three cycle portions, namely, an irreversible isobaric Rankine steam cycle portion, an irreversible isobaric Carnot steam cycle portion and a reversible isobaric Rankine steam cycle portion. The term "simultaneously, as used herein, means that at some time in the combined steam cycle all three portions are operating.

It should be noted that the structural components in the schematic diagrams of the apparatus in FIGS. 1 through 4 are identical, the only difference being in the status (i.e. open or closed) of the three valves in the apparatus.

Figure 1:
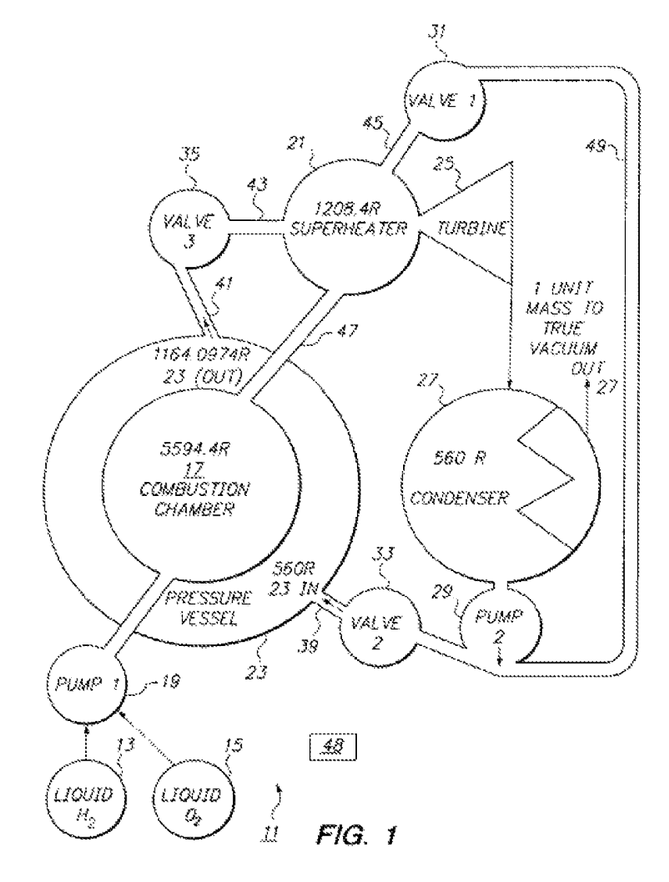
FIG. 1 is a schematic diagram of a hydrogen based combined steam cycle apparatus according to this invention.

Referring now to the drawings, there is shown in FIG. 1 a schematic diagram of a hydrogen based combined steam cycle apparatus constructed according to this invention and identified by reference numeral 11.

Apparatus 11 includes a source 13 of liquid oxygen (LOX), a source 15 of liquid hydrogen (LHY), a spherical combustion chamber 17 and a first pump 19. Apparatus 11 further includes a superheater 21 having a first inlet 21-1, a second inlet 21-2, a third inlet 21-3 and an outlet 21-4, a spherical pressure vessel 23 surrounding combustion chamber 17 and having a first inlet 23-1 and a first outlet 23-2, a steam turbine 25 operatively connected to superheater 21 and a condenser 27 operatively connected to turbine 25 and a second pump 29. Apparatus 11 also includes a first valve 31, a second valve 33, a third valve 35, a first conduit 37, a second conduit 39, a third conduct 41, a fourth conduit 43, a fifth conduit 45, a sixth conduit 47 and a seventh conduit 49. Finally, apparatus 11 includes a computer 48 for controlling the operation of valves 31, 33 and 35 and pumps 19 and 29. For simplicity, the electrical connections from computer 48 to valves 31, 33 and 35 and pumps 19 and 25 are not shown but are within the knowledge of a person skilled in the art.

Now, the operation of the individual components making up apparatus 11 will be briefly described.

In combustion chamber 17, liquid hydrogen (LHY) and liquid oxygen (LOX) are burned producing working fluid mass, heat and radiant energy for use in the combined steam cycle. Working fluid leaves combustion chamber 17 in a plasma state. Pump 19 under the control of computer 48, regulates the flow of working fluid into combustion chamber 17 where they are burned and produce optimum flow of working fluid mass. Computer 48 also controls the temperature of combustion chamber 17 to prevent overheating. Pressure vessel 23 provides cooling to also prevent the overheating of combustion chamber 17. While absorbing the heat produced by radiant energy in combustion chamber 17, heat is absorbed by working fluid contained in pressure vessel 23.

Valves 33 and 35 under the control of computer 48, control the inflow and outflow of working fluid from pressure vessel 23. At steam superheater 21, plasma from combustion chamber 17 is cooled by either liquid water from pump 29 at 560 R/3200 PSIA or working fluid mass at the thermodynamic state around the critical point in pressure vessel 23 before use at turbine 25. After leaving turbine 25, working fluid enters condenser 27 where an amount of working fluid mass equal to the mass of the liquid gases pumped in from pump 19 flows to the true vacuum at condenser 27 out and working fluid mass equal to that used to cool plasma from combustion chamber 17 flows to pump 29 for re-use.

First valve 31, under the control of computer 48, regulates the flow of working fluid from pump 29 to superheater 21 in the irreversible Isobaric Rankine portion of the combined cycle. At pump 29, liquid water which enters from condenser 27 has its pressure increased to 3200 PSIA before reintroduction into the combined cycle at either superheater 21 or pressure vessel 23.

In conduits 39, 41, 45 and 49, which conduits connect pump 29 to superheater 21 and pressure vessel 23, the pressure of the liquid water is maintained at 3200 PSIA and the temperature at 560 R.

Figure 2:
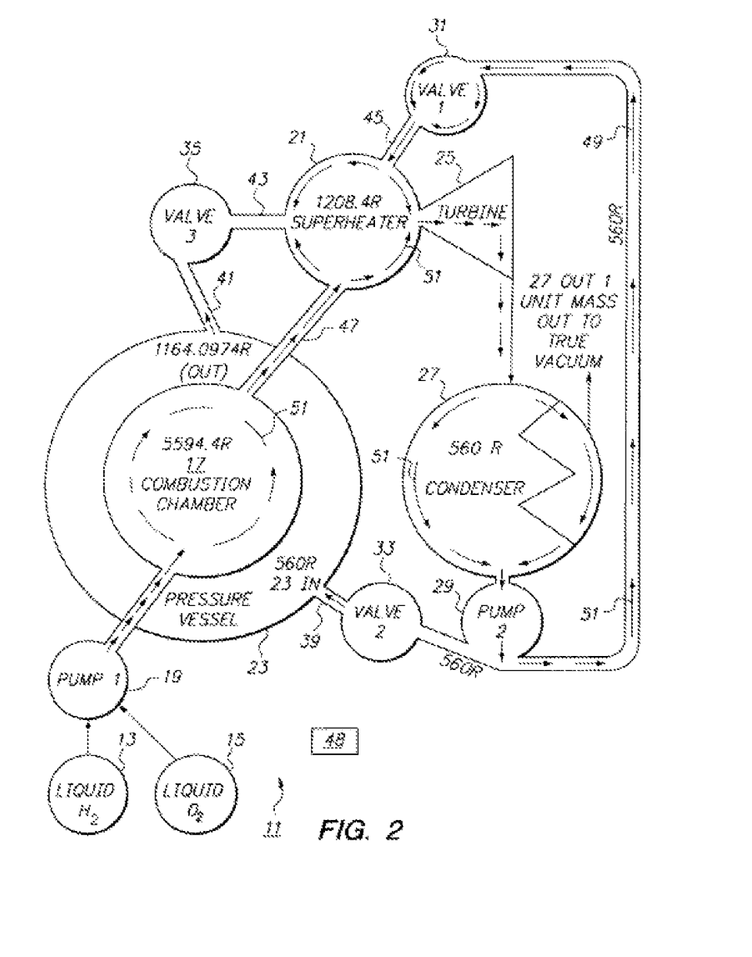
FIG. 2 is a schematic diagram of the hydrogen based combined steam cycle apparatus in FIG. 1, illustrating in more detail the flow of working fluid in the irreversible isobaric Rankine steam cycle portion of the combined cycle.
Figure 3:
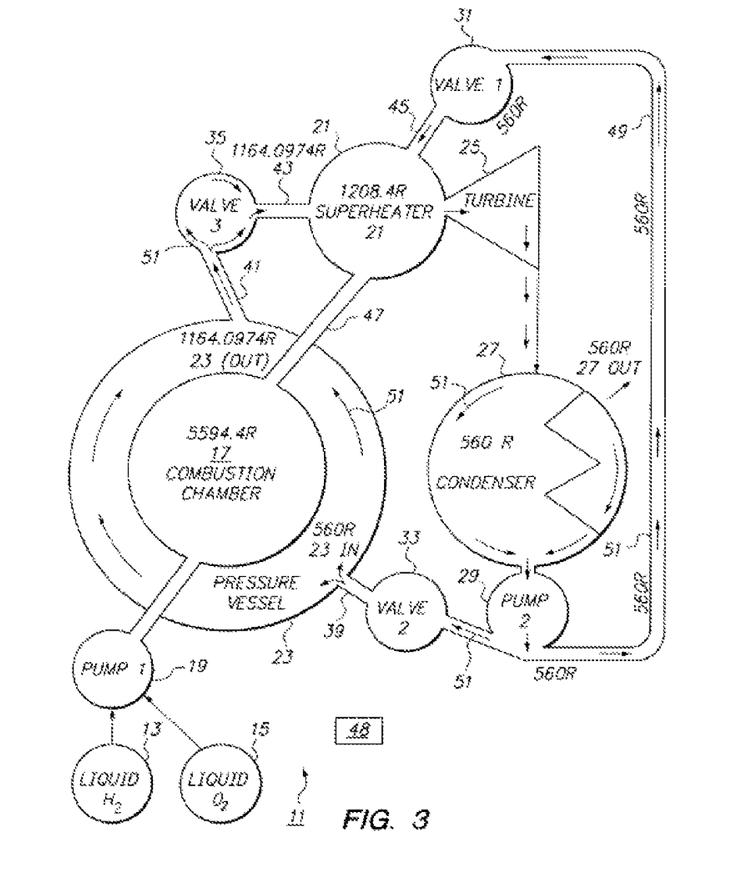
FIG. 3 is a schematic diagram of the hydrogen based combined steam cycle apparatus in FIG. 1, illustrating in more detail the flow of working fluid in irreversible isobaric Carnot steam cycle portion of the combined cycle.
Figure 4:
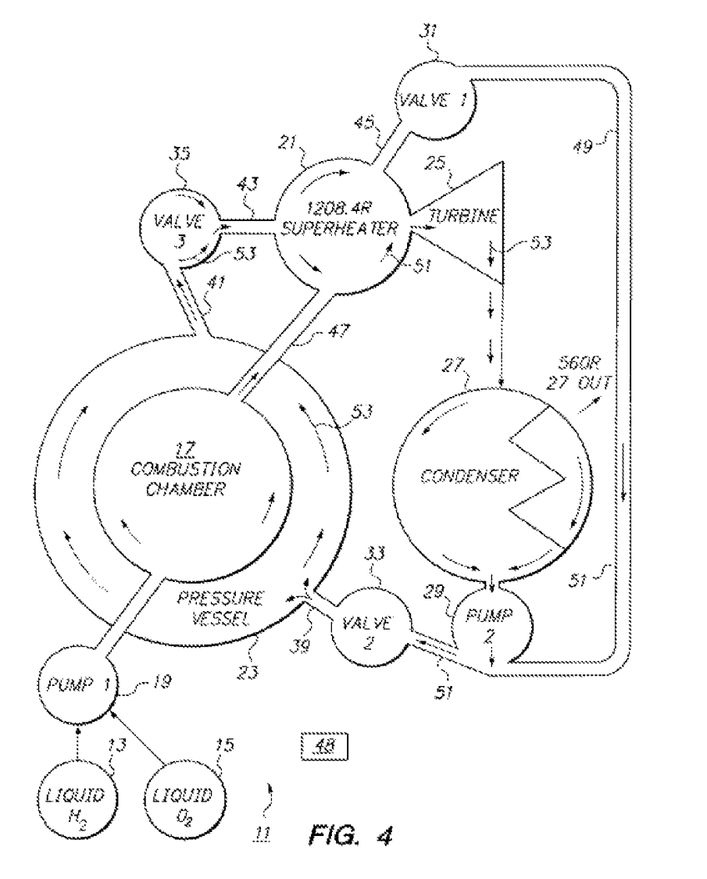
FIG. 4 is a schematic diagram of the hydrogen based combined steam cycle apparatus in FIG. 1, illustrating in more detail the flow of working fluid in reversible isobaric Rankine steam cycle portion of the combined cycle.

Referring now to FIGS. 2 through 4 and first to FIG. 2, the combined cycle starts with an irreversible isobaric Rankine steam cycle portion (elements 19-17-21-27), where 1 unit of working fluid enters pump 19 at (T low) 81.5 R and (P high) 3200 PSIA in the form of liquid gasses which are pumped into combustion chamber 17 as in a conventional Rankine steam cycle. In FIGS. 2, 3 and 4 the flow of the working fluid is shown by arrows 51. Also, valve 31 is open and valves 33 and 35 are closed. The improvement over a conventional thermal Rankine steam cycle lies in the fact that the working fluid mass which enters the cycle is also the fuel and oxidant. Working fluid is burned in combustion chamber 17 producing 1 unit of plasma working fluid at 5594.4 R/3200 PSIA in combustion chamber 17. The plasma working fluid provides working fluid mass, heat and radiant energy for all 3 portions of the combined cycle. One unit of working fluid in the form of Plasma flows to superheater 21 where it is cooled to 1208.4 R by 6.7643 units of liquid water at 560 R from pump 29 at 560 R/3200 PSIA before its use at the turbine 25 where it produces 7.7653 units of work out. After leaving turbine 25, 7.7643 units of working fluid flow into condenser 27. In condenser 27, 1 unit of liquid water at 560 R/IPSIA is allowed to flow to the true vacuum (27 out) and 6.7643 units of liquid water flow to second pump 29 where the pressure is increased to 3200 PSIA to be used for cooling superheater 21 or the pressure vessel 23 and combustion chamber 17.

The Irreversible Isobaric Carnot and Reversible Isobaric Rankine portions of hydrogen based combined cycle apparatus 11 expand the boundaries of the system by introducing working fluid from pressure vessel 23 that surrounds combustion chamber 17. Liquid water in the pressure vessel 23 is used to cool the walls of combustion chamber 17 that have been heated by radiant energy produced by burning hydrogen (LHY) and oxygen (LOX).

Referring now to FIG. 3, there is shown a schematic diagram of the irreversible isobaric Carnot steam portion of cycle (17-23-21-27) of apparatus 11 wherein working fluid enters at (T-high) and the spacially dependent time evolving cycle begins. Initially, valve 31 is open and valves 33 and 35 are closed.

The Irreversible Isobaric Carnot steam cycle portion of apparatus 11 utilizes radiant energy produced by the combustion of hydrogen (LHY) and oxygen (LOX) in combustion chamber 17 to preheat liquid water working fluid in pressure vessel 23 to 11.64.0974 R/3200 PSIA. As the liquid water in pressure vessel 23 heats, the combustion chamber is cooled. Once the working fluid in pressure vessel 23 reaches the thermodynamic state around the critical point (1164.0974 R/3200 PSIA), valve 31, which allows liquid water at 560 R to flow from pump 29 to superheater 21 and cool the plasma from combustion chamber 17 is closed. Valves 33 and 35, which had been closed in the irreversible Isobaric Rankine steam cycle portion of the combined cycle and which allow liquid water to flow from pump 29 to pressure vessel 23 and from pressure vessel 23 to superheater 21 are then opened. The temperature of working fluid used for cooling is increased from 560 R to 1164.0974 R and the total working fluid mass flowing through turbine 25 is increased from 7.7654 units to 100 units without adding any additional fuel. After flowing through the turbine 25 to condenser 27, 1 unit of working fluid 51 flows out to the true vacuum (27 out) and 99 units of working fluid flow back to the pump 29 to be pumped to pressure vessel 23 for re-use namely for cooling the combustion chamber 17 and superheater 21.

Referring now to FIG. 4, there is shown a schematic diagram of the reversible isobaric Rankine steam cycle portion of apparatus 11.

The reversible isobaric Rankine steam cycle (29-23-21-27) is the last portion of the combined steam cycle apparatus 11 to evolve and utilizes radiant energy from combustion chamber 17 to heat working fluid in pressure vessel 23 as the working fluid in pressure vessel 23 cools the walls of the combustion chamber 17. The working fluid at the thermodynamic state around the critical point from pressure vessel 23 is then used to cool plasma from combustion chamber 17 and be superheated in superheater 21 before being used at the turbine 25. The cycle begins when liquid water working fluid from pump 29 at 560 R/3200 PSIA enters the pressure vessel 23 where it is heated by radiant energy from combustion chamber 17 before flowing to superheater 21 and being used to cool plasma from combustion chamber 17 for use at the turbine 25. The working fluid flowing out of the turbine 25 flows to the condenser 27 where 1 unit of working fluid 51 flows out to the true vacuum 27 out) and 99 units flow back to pump 29 for re-use.

Figure 5:
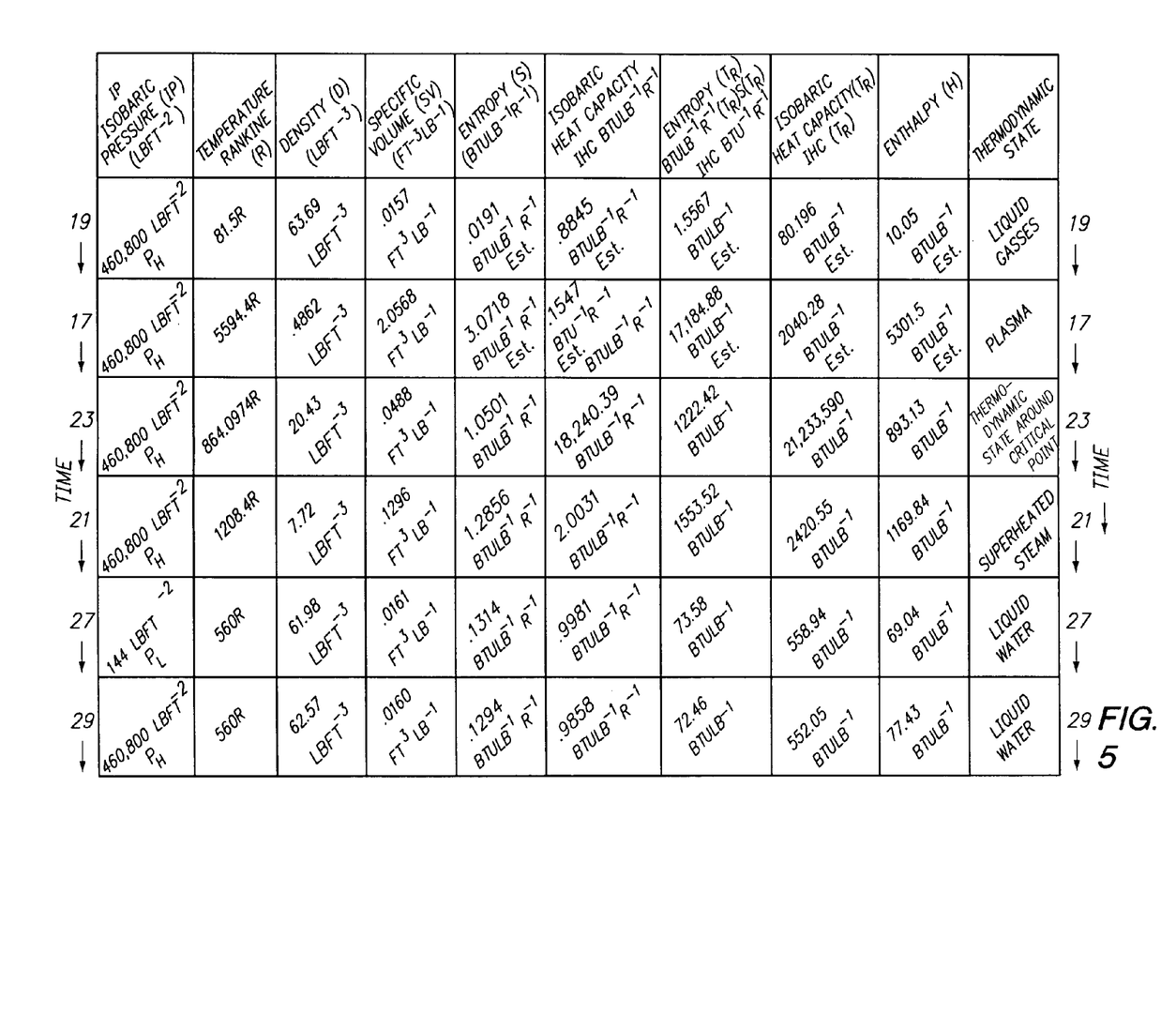
FIG. 5 is a table showing the thermodynamic properties of the working fluid throughout the combined cycle.

FIG. 5 is a table showing the thermodynamic properties of the working fluid throughout the combined cycle. The values of 23, 21, 27 and 29 are from the IAPWS Industrial Formulation for the thermodynamic properties of water and steam 1997. The properties 19 are based on the density and temperature of liquid hydrogen & oxygen as found in the Handbook of Chemistry & Physics 38$^{th}$ Edition, or later.

Figure 6:
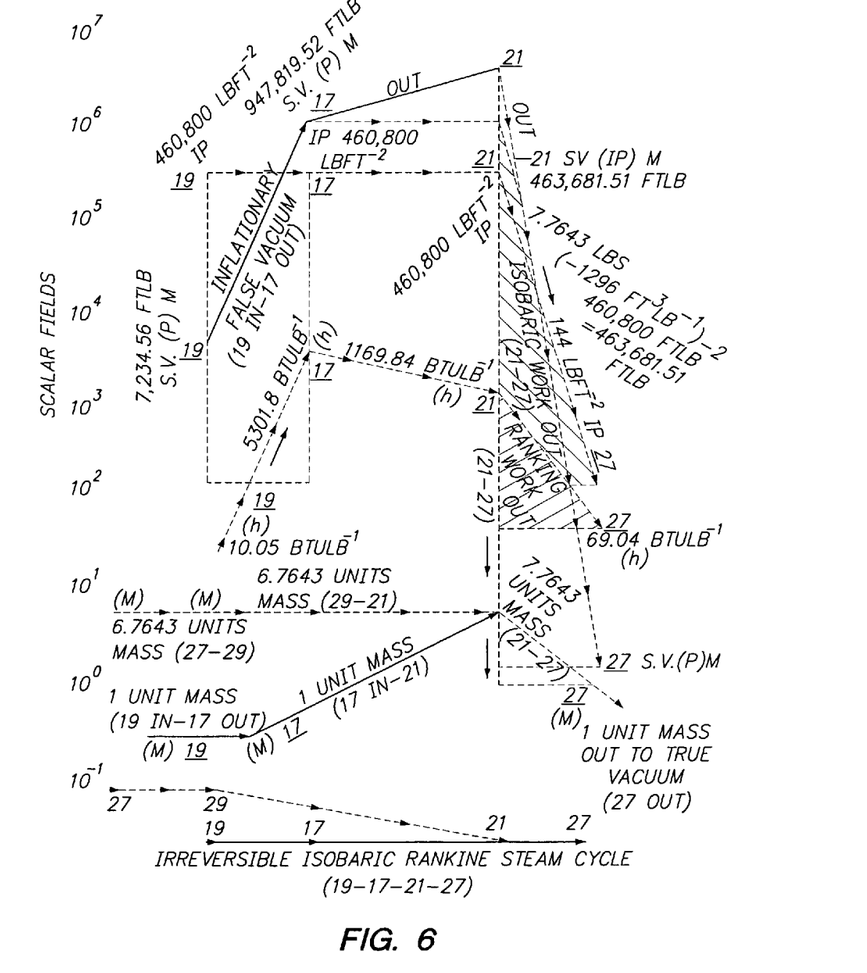
FIG. 6 is a graph showing the irreversible isobaric Rankine steam cycle portion of the combined cycle.
Figure 7:
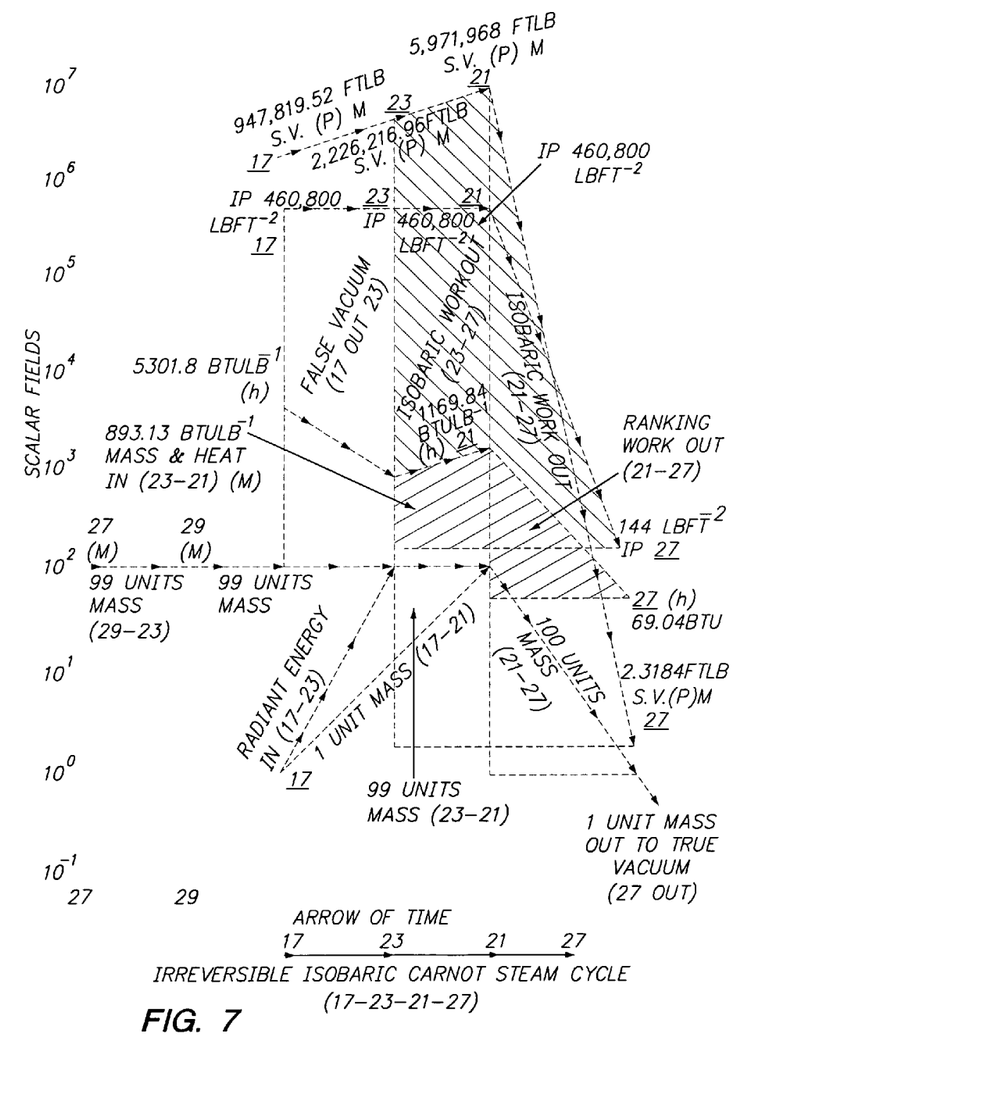
FIG. 7 is a graph showing the irreversible isobaric Carnot steam cycle portion of the combined cycle.

FIG. 6 is a graph showing the irreversible isobaric Rankine steam cycle;

FIG. 7 is a graph showing the irreversible isobaric Carnot steam cycle; and

Figure 8:
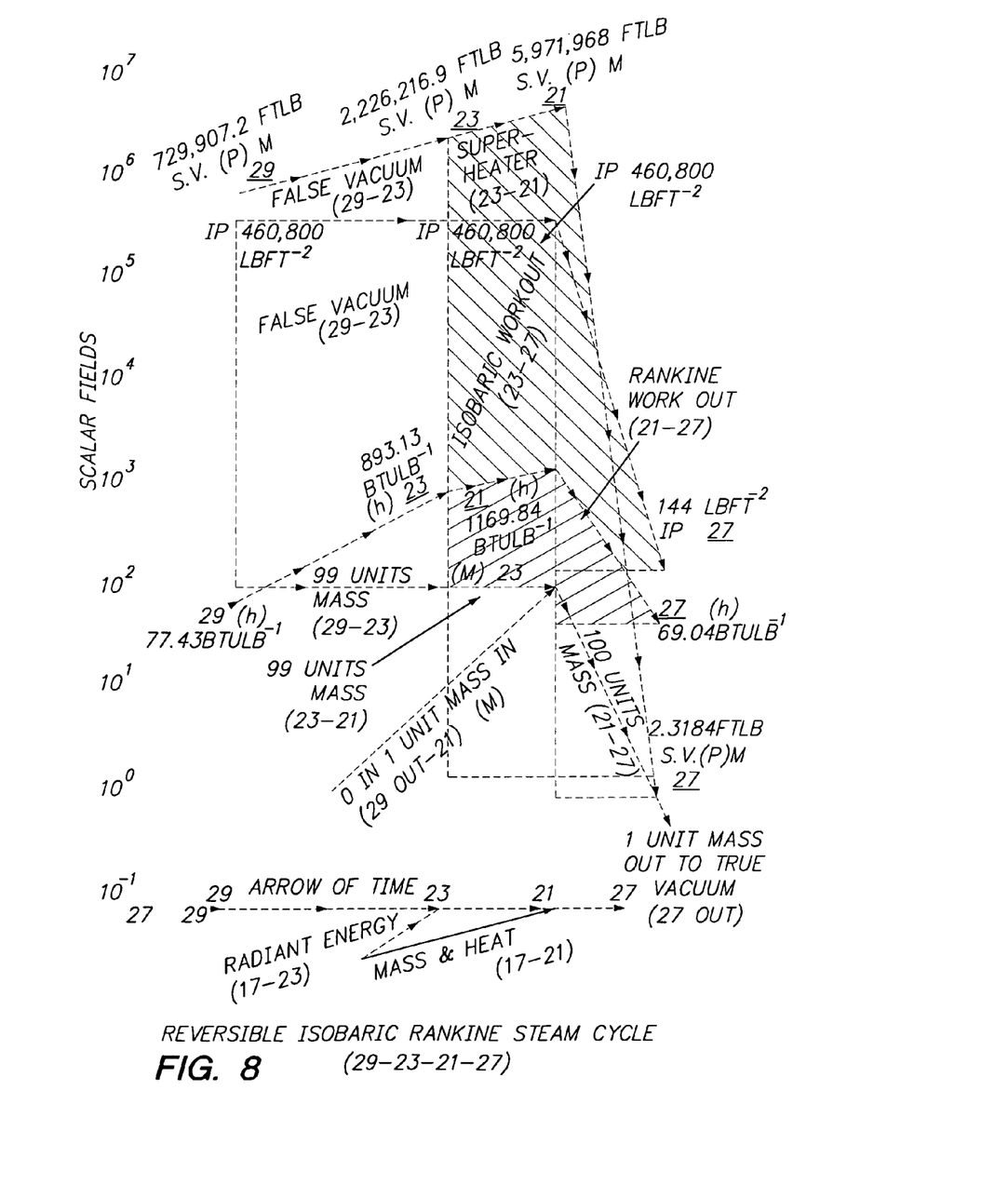
FIG. 8 is a graph showing the reversible isobaric Rankine steam cycle portion of the combined cycle.

FIG. 8 is a graph showing the reversible isobaric Rankine steam cycle.

In summary, it is seen that the combined steam cycle apparatus 11 of this invention has three portions namely, an irreversible isobaric Rankine steam cycle portion, an irreversible isobaric Carnot steam cycle portion and a reversible isobaric Rankine steam cycle portion and that there are three valves 31, 33 and 35 which are under control of computer 48 and are either open or closed, depending on which cycle portion is operating. Specifically, in the irreversible isobaric Rankine steam cycle portion, valve 31 is open and valves 33 and 35 are closed. In the irreversible isobaric Carnot steam cycle portion, valve 31 is closed and valves 33 and 35 are open. In the reversible isobaric Rankine steam cycle portion, valve 31 is closed and valves 33 and 35 are open. Also, it should be noted that condenser 27 and superheater 21 are used in all three steam cycle portions while combustion chamber 17 is used in only the irreversible isobaric Rankine steam cycle portions and the irreversible isobaric Carnot steam cycle portion.

The embodiment of the present invention described above is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A hydrogen based combined steam turbine apparatus having an irreversible isobaric Rankine steam cycle portion, an irreversible isobaric Carnot steam cycle portion and a reversible isobaric Rankine steam cycle portion, said three steam cycle portions operating simultaneously, said apparatus comprising:
    (a) a source of liquid oxygen;
    (b) a source of liquid hydrogen;
    (c) a combustion chamber;
    (d) a first pump connected to the source of liquid oxygen and to the source of liquid hydrogen for pumping liquid oxygen from the source of liquid oxygen and liquid hydrogen from the source of liquid hydrogen into the combustion chamber where said liquid oxygen and said liquid hydrogen are burned to produce heat, radiant energy and a working fluid mass, said working fluid mass being in the form of a plasma;
    (e) a superheater connected to the combustion chamber for receiving plasma from the combustion chamber and cooling said plasma;
    (f) a pressure vessel surrounding the combustion chamber for cooling the combustion chamber;
    (g) a steam turbine connected to the superheater for receiving said working fluid mass from the superheater and outputting work;
    (h) a condenser operatively connected to the steam turbine for receiving said working fluid mass from the steam turbine and outputting liquid water;
    (i) a second pump connected to the condenser and operatively coupled to the pressure vessel for pumping liquid water from the condenser to the pressure vessel for cooling one of the combustion chamber and the superheater;
    (j) a first valve connected to the superheater and the second pump for regulating the flow of said working fluid mass from the second pump to the superheater;
    (k) a second valve positioned in a conduit being coupled between the second pump and the pressure vessel for regulating the flow of said working fluid mass;
    (l) a third valve coupled between the output of the pressure vessel and the second inlet to the superheater regulating the flow of said working fluid mass from the pressure vessel to the superheater; and
    (m) a non statutory computer readable medium encoded including a computer program for controlling the operation of the first valve, the second valve, the third valve, the first and second pumps and the temperature of the combustion chamber with respect to the flow of said working fluid mass.

2. The hydrogen based combined steam turbine apparatus of claim 1 wherein the first valve controls the flow of said working fluid mass from the second pump to the pressure superheater and the second and third valves control the flow of liquid water from the second pump to the pressure vessel and from the pressure vessel to the superheater.

3. The hydrogen based combined steam turbine apparatus of claim 2 wherein said combustion chamber is spherically shaped and said pressure vessel is spherically shaped.

4. A method of operating a combined cycle hydrogen based steam turbine apparatus having a source of liquid oxygen, a source of liquid hydrogen, a combustion chamber, a superheater, a pressure vessel surrounding the combustion chamber, a steam turbine and a condenser, the method comprising:
    (a) burning liquid oxygen and liquid hydrogen in the combustion chamber to produce heat, radiant energy and plasma working fluid mass;
    (b) cooling plasma from the combustion chamber in the superheater;
    (c) receiving working fluid mass from the superheater to the steam turbine and outputting work;
    (d) receiving at least some of the working fluid mass from the steam turbine in the condenser and outputting liquid water, at least some of which is sent to the pressure vessel for use in preventing overheating of the combustion chamber,
    (e) wherein at least some of the liquid water is supplied to the pressure vessel to cool the combustion chamber;
    (f) a control unit;
    (g) regulating the flow of the working fluid mass to the superheater by a first valve;
    (h) regulating the flow of the working fluid mass to the pressure vessel by a second valve; and
    (i) regulating the flow of the working fluid mass from the pressure vessel to the superheater by a third valve.

5. The method of claim 4 wherein the liquid hydrogen and liquid oxygen enter a pump at 81.5R and 3200PSIA to pump the working fluid mass into the combustion chamber.

6. The method of claim 5 wherein the plasma produced in the combustion chamber is at 5594.R/3200PSIA.

7. A hydrogen based combined steam cycle apparatus having an irreversible isobaric Rankine steam cycle portion, an irreversible isobaric Carnot steam cycle portion and a reversible isobaric Rankine steam cycle portion, said three steam cycle portion operating simultaneously, said apparatus comprising:
    (a) a source of liquid oxygen, said source having an outlet;
    (b) a source of liquid hydrogen, said source having an outlet;
    (c) a combustion chamber; said combustion chamber having an inlet and an outlet;

(d) a first conduit having an inlet and an outlet end; the outlet end being connected to the inlet of the combustion chamber;

(e) a first pump having an outlet connected to the inlet end of the first conduit for pumping liquid oxygen from the source of liquid oxygen and liquid hydrogen from the source of liquid hydrogen into the combustion chamber where said liquid oxygen and said liquid hydrogen are burned to produce heat, radiant energy and working fluid mass;

(f) a second conduit having an inlet end connected to the outlet of the combustion chamber and an outer end;

(g) a superheater having first, second and third inlets and one outlet, said first inlet being connected to the outlet of the combustion chamber, said superheater receiving the working fluid mass in the form of plasma from the combustion chamber and cooling said plasma;

(h) a pressure vessel surrounding the combustion chamber and having an inlet and an outlet;

(i) a steam turbine coupled to the outlet of the superheater for receiving the working fluid mass from the superheater and outputting work;

(j) a condenser operatively connected to the steam turbine for receiving the working fluid mass from the steam turbine and having an output outputting liquid water;

(k) a first valve;

(l) a second valve;

(m) a third conduit coupled between the first valve and the second valve;

(n) a second pump operatively connected to the condenser for pumping liquid water from the condenser to the pressure vessel for cooling the combustion chamber through the third conduit, the second valve and a fourth conduit;

(o) the second valve coupled between the second pump and the pressure vessel for regulating the flow of the working fluid mass from the second pump to the pressure vessel;

(p) a third valve coupled between the pressure vessel and the superheater for controlling the flow of the working fluid mass from the pressure vessel to the superheater; and (q) a non-transitory computer readable storage medium encoded with a computer program for controlling the operation for the first valve, the second valve, the third valve, the first and second pumps and the temperature of the combustion chamber with respect to the flow of said working fluid mass.

\* \* \* \* \*